Aug. 14, 1928.
B. L. WALKUP
1,680,919
BELT CLAMP
Filed Dec. 2, 1927
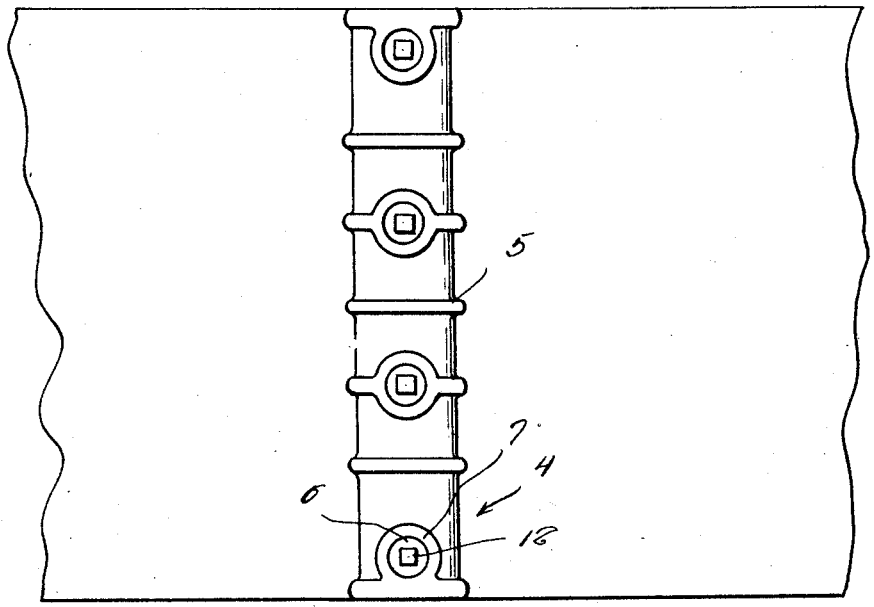
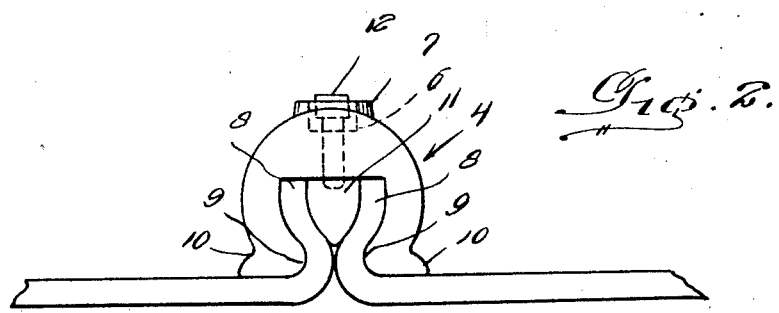
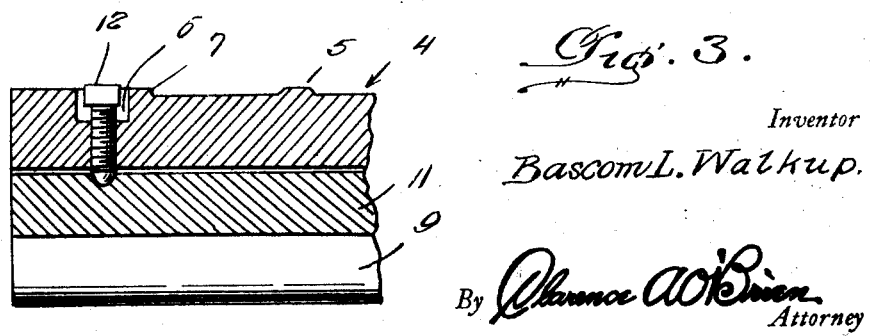
Inventor
Bascom L. Walkup.
By Clarence A O'Brien
Attorney Patented Aug. 14, 1928.

1,680,919

UNITED STATES PATENT OFFICE.

BASCOM LEE WALKUP, OF MEXIA, TEXAS.

BELT CLAMP.

Application filed December 2, 1927. Serial No. 237,249.

This invention relates to an improved clamp especially designed for fastening together, the split ends of a belt such as is used for driving, power purposes, and the like.

What I have endeavored to do, is provide an exceptionally simple and inexpensive mechanical appliance of this class which is positive and dependable in action, and which is characterized by an arrangement of details, serving to provide an improved product of manufacture which is economical, modernized, practicable, and such as to be assured of commercial success.

Briefly, the invention comprises an elongated casting constructed on one side of a channel for reception of the adjacent belt-ends, the mouth of the channel being restricted to provide clamping shoulders, and there being a wedge located in the channel for binding the belt ends against the shoulders, to connect the ends tightly together.

In the drawings:—

Figure 1 is a top plan view of a portion of a belt equipped with a clamp constructed in accordance with the present invention.

Fig. 2 is an end view of the same.

Fig. 3 is an enlarged fragmentary detail section.

In the drawings, the reference numeral 4 designates the casting which, as before stated is of elongated form, and is here provided at longitudinally spaced points with internal reinforcing ribs 5 and with longitudinally spaced sockets 6 surrounded by outstanding bosses 7. The casting is provided with a channel or concavity for reception of the belt ends 8 as shown in Fig. 2, and it will be noticed that the mouth of the channel is constricted, and provided with shoulders 9.

In addition, it is provided with outstanding flanges 10 bearing against the end portions of the belts. The walls of the channel are curved somewhat oppositely to the surfaces of a complemental wedge 11 which is located in the channel being slipped through the ends of the same into place to be engaged by the retaining bolts 12. Incidentally these bolts are threaded through the casting and against the wedge shown in Fig. 3, to force it between the ends of the belt and to force these ends out against the walls of the channel and to bind them against the shoulders 9.

The headed ends of these bolts are located in the sockets 6. From the foregoing description and drawings, it is obvious that the belt ends of the belt is slipped into the channel of the body or casting, whereupon the wedge bar 11 is slipped endwise between the belt ends, so that it occupies the position shown in Fig. 2. Then the bolts are tightened down against the bar, whereupon it acts as a wedge to force the belt ends firmly against the walls of the channel and against the shoulder, whereupon they will be firmly connected with the body and thereby connected together.

It is believed that by considering the description in connection with the drawings, a clear understanding of the construction and advantages of the invention will be had. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:—

As a new product of manufacture, a belt clamp of the class described comprising an elongated casting provided on one side with an open ended channel, having spaced opposed arcuate walls and an inner flat wall, the entrance portion of the channel being restricted by the presence of inwardly projecting shoulders, the belt ends being adapted to extend between the shoulders, to be forced against said arcuate walls with their extremities resting in contact with said flat walls, an elongated wedge bar located in said channel, and bolts threaded through said casting and engageable with said bar, whereby to permit the bar to be forced between the belt ends to force the belt ends into engagement with the walls of the channel and said shoulders.

In testimony whereof I affix my signature.

BASCOM LEE WALKUP.